(12) United States Patent
Kamat et al.

(10) Patent No.: US 10,393,059 B2
(45) Date of Patent: Aug. 27, 2019

(54) CYLINDER LINER FOR AN INTERNAL COMBUSTION ENGINE AND METHOD OF FORMING

(71) Applicant: Ford Global Technologies, LLC, Dearborn, MI (US)

(72) Inventors: Prasad Kamat, Canton, MI (US); Jonathan Robert Burns, Windsor (CA); Daryl Gene Self, Trenton, MI (US); Bryan McKeough, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/472,903

(22) Filed: Mar. 29, 2017

(65) Prior Publication Data
US 2018/0283309 A1    Oct. 4, 2018

(51) Int. Cl.
| F02F 1/00 | (2006.01) |
| F02F 1/02 | (2006.01) |
| B22D 19/00 | (2006.01) |

(52) U.S. Cl.
CPC .......... *F02F 1/004* (2013.01); *B22D 19/0009* (2013.01); *F02F 1/02* (2013.01); *B23B 2215/242* (2013.01); *F02F 2200/06* (2013.01)

(58) Field of Classification Search
CPC .......... F02F 1/004; F02F 1/02; F02F 2200/06; B22D 19/0009; B23B 2215/242
See application file for complete search history.

(56) References Cited

U.S. PATENT DOCUMENTS

| 5,363,821 A | 11/1994 | Rao et al. |
| 5,365,997 A | 11/1994 | Helgesen et al. |
| 5,582,144 A | 12/1996 | Mizutani |
| 5,771,955 A | 6/1998 | Helgesen et al. |
| 6,354,259 B2 | 3/2002 | Fischer et al. |
| 7,000,584 B1 | 2/2006 | Wynveen et al. |
| 7,191,770 B1 | 3/2007 | Anderson et al. |

(Continued)

FOREIGN PATENT DOCUMENTS

EP    2175116 A1    4/2010

OTHER PUBLICATIONS

Suzuki et al., "Development of New V6 3.5L Gasoline Engine for Acura RLX", SAE International, vol. 6, Issue 1, May 2013, 8 pages.

*Primary Examiner* — Jacob M Amick
*Assistant Examiner* — Charles Brauch
(74) *Attorney, Agent, or Firm* — Brooks Kushman P.C.; Julia Voutyras (57) ABSTRACT

A method of forming an engine is provided. A liner is cast with an outer surface with a first texture extending circumferentially from a first end to a second end of the liner. A section of the outer surface of the liner is machined to provide a second texture extending circumferentially about the liner and spaced apart from the first end, wherein the second texture has a lower specific surface area than the first texture. An engine and a cylinder liner for the engine are provided. The liner has first and second ends with an outer surface extending therebetween. An outer surface of the liner has axial sections defining different textures to form material interfaces with the block with different thermal conductivities thereacross.

11 Claims, 4 Drawing Sheets

(56) References Cited

U.S. PATENT DOCUMENTS

| | | |
|---|---|---|
| 7,533,647 B2 | 5/2009 | Miyamoto et al. |
| 8,037,860 B2 | 10/2011 | Takami et al. |
| 8,402,881 B2 | 3/2013 | Sato et al. |
| 9,089,893 B2 | 7/2015 | Horigome et al. |
| 2006/0249105 A1* | 11/2006 | Azevedo ............... F02F 1/16 123/41.84 |
| 2007/0012179 A1* | 1/2007 | Takami ............ B22D 19/0009 92/171.1 |
| 2010/0206261 A1* | 8/2010 | Berghian ............... F02F 1/14 123/193.2 |
| 2013/0055993 A1 | 3/2013 | Kantola et al. |
| 2016/0040620 A1* | 2/2016 | Highum ............ B22D 19/0081 123/41.72 |
| 2016/0177863 A1 | 6/2016 | Hamada et al. |
| 2016/0326979 A1 | 11/2016 | Baek et al. |

\* cited by examiner

CYLINDER LINER FOR AN INTERNAL COMBUSTION ENGINE AND METHOD OF FORMING

TECHNICAL FIELD

Various embodiments relate to a cylinder liner for an internal combustion engine and a method of making the cylinder liner and engine.

BACKGROUND

Internal combustion engines require thermal management to control the temperature of the components of the engine. For example, a cylinder block commonly has a cooling jacket with a circulating fluid flowing therethrough to cool the block and the cylinder liners in the block. During engine operation, the bore wall of a cylinder liner may have a non-uniform temperature along the length of the liner, for example, due to higher temperature gases in the upper region of the liner. The difference in bore wall temperature may lead to distortion of the cylinder liner such that the bore wall becomes non-cylindrical and/or changes shape along a length of the liner. Cylinder bore distortion may result in the piston rings having difficulty conforming to the cylinder wall during engine operation as the bore shape changes, and this in turn may lead to higher blow-by of combustion gases, increased engine oil or lubricant consumption, additional engine noise, wear of the piston rings, and reduced engine efficiency and fuel economy.

SUMMARY

According to an embodiment, a method of forming an engine is provided. A liner is cast with an outer surface with a first texture extending circumferentially from a first end to a second end of the liner. A section of the outer surface of the liner is machined to provide a second texture extending circumferentially about the liner and spaced apart from the first end, wherein the second texture has a lower specific surface area than the first texture.

According to another embodiment, an engine is provided with a cylinder liner having an outer surface and an inner surface extending from a first end to a second end of the liner. The engine has a cylinder block formed about the cylinder liner with a first end of the liner adjacent to a deck face of the block. The block defines a cooling jacket extending circumferentially about at least a portion of the outer surface of the liner and spaced apart therefrom. A first circumferential section of the outer surface of the liner has a first texture forming a first material interface with the block, with the first circumferential section having a first diameter. The first material interface has a first thermal conductivity thereacross. A second circumferential section of the outer surface of the liner has second texture forming a second material interface with the block. The second material interface has a second thermal conductivity thereacross, with the second thermal conductivity being less than the first thermal conductivity. The second circumferential section has a second diameter. The first circumferential section is positioned between the first end and the second circumferential section. A specific surface area of the first texture is greater than a specific surface area of the second texture. The second diameter is less than the first diameter.

According to yet another embodiment, an engine cylinder liner is provided with a tubular member having first and second ends with an outer surface extending therebetween. A specific surface area and a diameter of the outer surface vary with an axial position on the liner to provide a thermal conductivity that varies with the axial position and is complementary to engine operating conditions. The specific surface area varies with a varying diameter of the cylinder.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
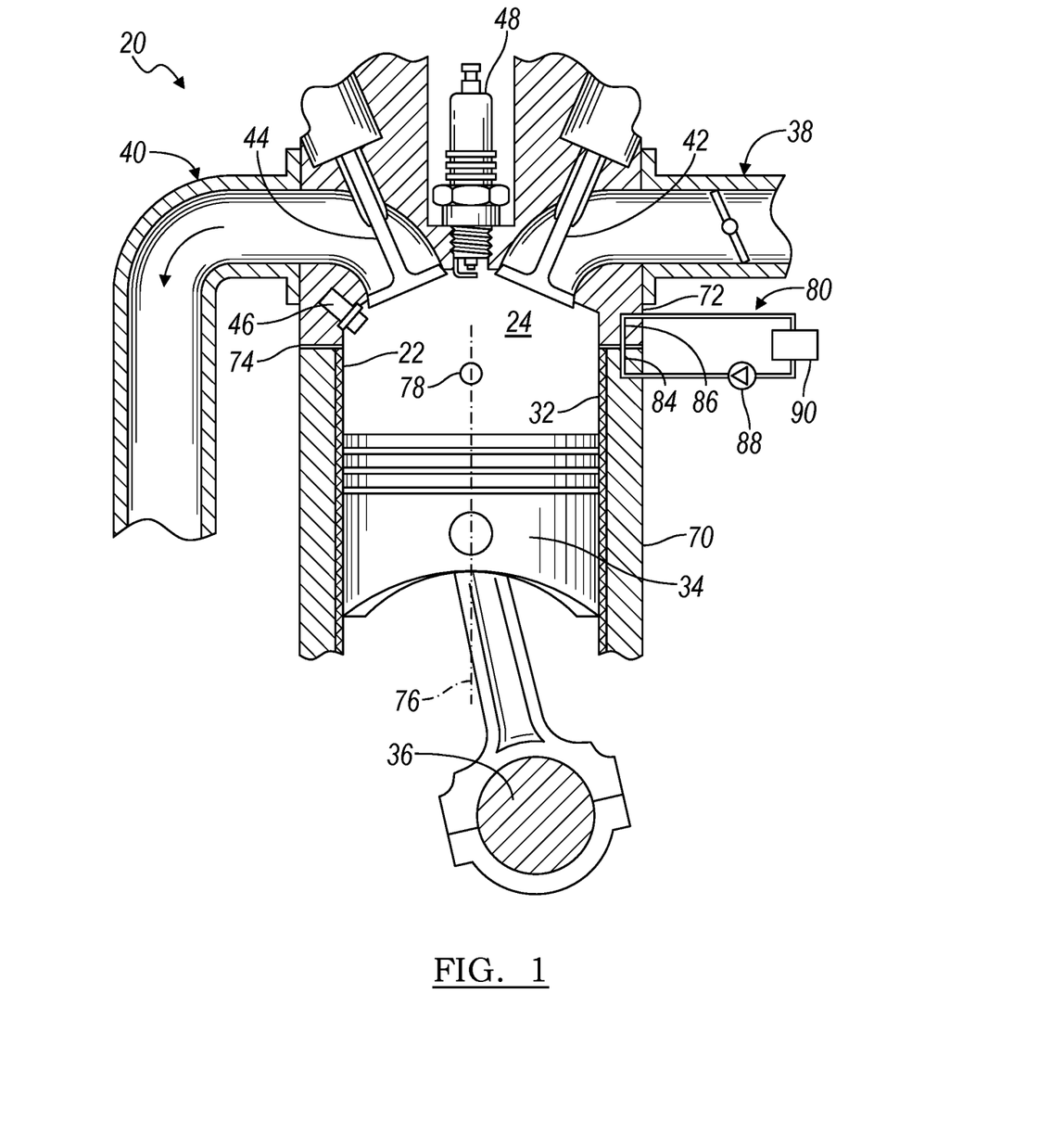
FIG. 1 illustrates a schematic of an internal combustion engine according to an embodiment.

FIG. 1 illustrates a schematic of an internal combustion engine 20. The engine 20 has a plurality of cylinders 22, and one cylinder is illustrated. In one example, the engine 20 is an in-line four cylinder engine, and, in other examples, has other arrangements and numbers of cylinders. In one example, the cylinders may be arranged using separate liners. In various examples, the cylinder block may have a closed deck configuration, a semi-open deck configuration, or an open deck configuration.

The engine 20 has a cylinder liner 32 that defines a cylinder, cylinder wall or bore wall 22; and the engine has a combustion chamber 24 associated with each cylinder 22. The liner 32 and piston 34 cooperate to define the combustion chamber 24. The piston 34 is connected to a crankshaft 36 to convert linear movement of the piston 34 to rotary motion of the crankshaft 36.

The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 30 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 30. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP sensor), an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other examples, the engine 20 may operate as a two-stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 has a cylinder head 72 that is connected to a cylinder block 70 or a crankcase to form the cylinders 22 and combustion chambers 24. A head gasket 74 is interposed between the cylinder block 70 and the cylinder head 72 to seal the cylinders 22. Each cylinder 22 is arranged along a respective cylinder axis 76. For an engine with cylinders 22 arranged in-line, the cylinders 22 are arranged along the longitudinal axis 78 of the block 70.

The engine 20 has one or more fluid systems 80. In the example shown, the engine 20 has a fluid system with associated jackets in the block 70 and head 72, although any number of systems is contemplated. The engine 20 has a fluid system 80 that may be at least partially integrated with the cylinder block 70, and may also be at least partially integrated with the head 72. The fluid system 80 has a jacket 84 in the block 70 fluidly connected to a jacket 86 in the head, that may act as a cooling system, a lubrication system, and the like. In other examples, the system 80 may only be provided by a jacket 84 in the block 70, and a separate cooling system may be used to cool the head 72.

In the example shown, the fluid system 80 is a cooling jacket and is provided to remove heat from the engine 20. The amount of heat removed from the engine 20 may be controlled by a cooling system controller or the engine controller. The fluid system 80 has one or more fluid jackets or circuits that may contain water, another coolant, or a lubricant as the working fluid in a liquid, vapor, or mixed phase state. In the present example, the first system 80 contains a coolant such as water, a water based coolant, a glycol based coolant, or the like. The fluid system 80 has one or more pumps 88, and a heat exchanger 90 such as a radiator. The pump 88 may be mechanically driven, e.g. by a connection to a rotating shaft of the engine, or may be electrically driven. The system 80 may also include valves, thermostats, and the like (not shown) to control the flow or pressure of fluid, or direct fluid within the system 80 during engine operation.

Various portions and passages in the fluid systems and jackets 80 may be integrally formed with the engine block and/or head as described below. Fluid passages in the fluid system 80 may be located within the cylinder block 70 and may be adjacent to and at least partially surrounding or completely surrounding each liner 32 in the block 70.

The cylinder liner 32 may be a different material than the block 70, or the same material as the block. The engine block 70 and cylinder head 72 may be cast from aluminum, an aluminum alloy, or another metal. The liner 32 may be formed from another material such as iron or a ferrous alloy. As such, an interface is formed between the liner 32 and the surrounding block 70 of the engine based on the different materials in the two components.

Figure 2A:
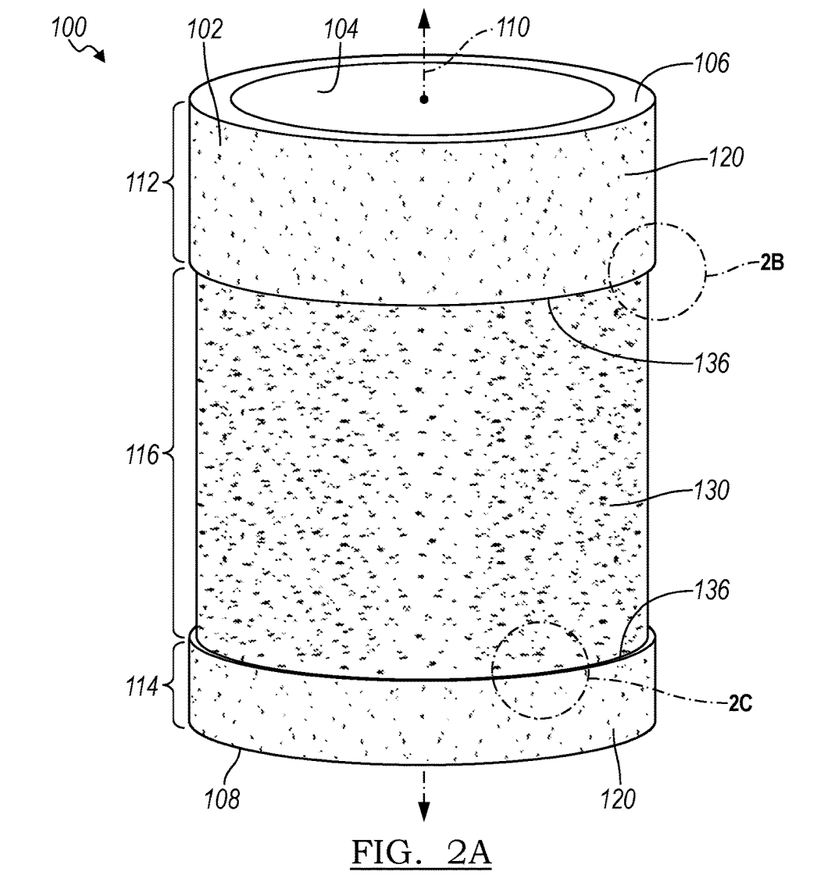
FIG. 2A illustrates a perspective view of a cylinder liner for use with the engine of FIG. 1.
Figure 2B:
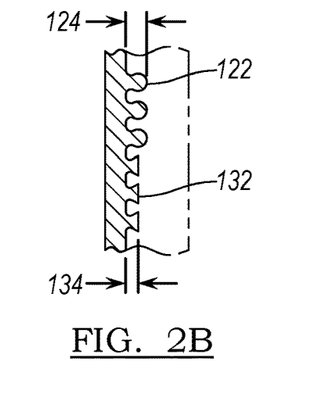
FIGS. 2B and 2C illustrate enlarged views of the liner of FIG. 2A.
Figure 2C:
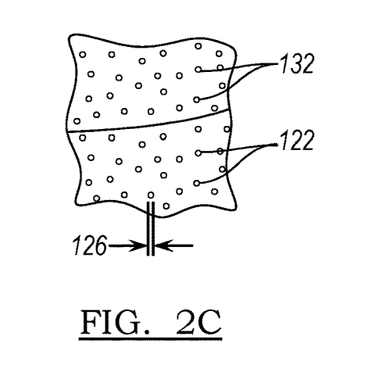

FIGS. 2A-2C illustrate a perspective view and enlarged views of a cylinder liner 100 for use with the engine 20 of FIG. 1, and may be used as liner 32. The liner 100 is formed by a tubular member with an outer surface 102 or outer wall, and inner surface 104 or inner wall. The inner wall 104 forms the bore wall or cylinder wall 22 in the block 70. The inner and outer walls 104, 102 extend from a first end 106 of the liner to a second end 108 of the liner. The outer wall 102 extends about a circumference of the liner and along an axial length of the liner, e.g. along axis 110, which corresponds with axis 76 in FIG. 1.

The liner 100 has an axial section 112 of the outer surface 102 directly adjacent to the first end 106. The liner 100 has an axial section 114 of the outer surface 102 directly adjacent to the second end 108. The first and second sections 112, 114 may have different axial lengths as shown, or may be the same length. The liner 100 also has another axial section 116 of the outer surface 102 that is positioned between the first and second sections 112, 114, and may be adjoining the first and second sections as shown. In other examples, the liner 100 may only be provided with the first and third axial sections 112, 116 such that the third axial section 116 extends from the first axial section 112 to the second end 108 of the liner.

The first and second axial sections 112, 114 each have a first texture 120 or a series of first projections 120 that cover the outer surface in these sections. The first texture 120 or first projections are formed from the same base material as the liner 100, and may be integrally formed with the liner, for example, during a casting process.

The series of first projections 120 has first projections 122 that extend outwardly from the liner 100. The projections 122 may be fins, spines, or other protruding shapes with a circular or noncircular cross sectional shape. In other examples, the projections 122 are formed by ribs that extend radially outwardly from the liner 100 and about at least a portion of the circumference of the liner. The cross-sectional area of the projection 122 may vary along a length of the projection. The projections 122 in the first texture 120 may be regular or irregular in shape. The projections 122 may have an undercut or negative surface. In alternative examples, the first texture 120 may include a porous structure along the outer surface of the liner, with the porous structure only extending a few millimeters into the liner.

In one example, each projection 122 has a generally circular cross sectional shape that changes along a length of the projection, e.g. by decreasing and then increasing in area along an axial length of the projection such that it is constricted or undercut in an intermediate region of the projection. In other examples, the projection 122 may have a constant cross sectional area along a length of the projection, or may decrease in area along a length of the projection. The projections 122 may be arranged in a random order or pattern on the surface, or may be organized into an array.

The series of first projections 120 has an associated density of projections 122 over a projected area or base area of the liner, for example, a feature density of more than 10, 20, 30, or 40 projections per square centimeter. In one example, the feature density is on the order of 30 projections per square centimeter. The first projections 122 may have an axial length or profile height 124 that is in the range of 0.2-4.0 millimeters, 0.5-3.0 millimeters, or on the order of one millimeter. Each first projection 122 has an average diameter 126 that is less than an axial length of the projection.

The first texture 120 or series of first projections has an associated first specific surface area. A specific surface area as defined herein is the actual surface area of the texture or projections per unit base area of the liner 100 that the projections extend over. For example, the specific surface area of the first texture 120 is the actual surface area of the outer surface of the liner 100 including the projections 122 divided by a specified base area of the liner 100 that the first texture extends over, e.g. the actual area if the projections were not present. The specific surface area may be calculated using the actual surface area of the outer surface including the projections in a specified area of the outer surface of the liner, and a surface area of the outer liner over the same specified area of the outer surface of the liner assuming that no projections were present. For example, the first specific surface area is greater than one and is a dimensionless number, and may be in the range of 2-100, 10-50, or 20-40 in various examples.

The first projections 122 may have a generally uniform size and shape, for example with dimensions of the first projections being within ten percent of one another. The variability in the size of the projections may be based in part on the formation process for the projections.

The third axial section 116 has a second texture 130. In one example, the second texture 130 is provided as a machined or otherwise formed texture. The second texture 130 may include cones, continuous or interrupted segments of a male thread-like texture in bands of varying pitch, transverse splines or ribs, and other textures. In one example, the second texture 130 is machined to have undercut surfaces.

In another example, the second texture 130 may be provided as a series of second projections that cover the outer surface 102 in this section. The second texture 130 or second projections are formed from the same base material as the liner. The second projections 132 of the series 130 have the same feature density as the series of first projections 120, or the same number of projections per unit projected area. The second projections 132 have a profile height 134 or axial length that is less than the profile height of the first projections 122. In one example, the first projections 122 are on the order of two millimeters, and the second projections 132 are on the order of 1.5, 1.0, or 0.5 millimeters. Therefore, the second texture 130 or series of second projections has a lower specific surface area than the first texture 120.

In a further example, the second texture 130 may be machined to a smoother surface finish, for example, with a specific surface area of one or approaching one.

The first axial section 112 of the liner 100 has a diameter associated with it and includes the axial depth or profile height of the first texture 120. The third axial section 116 of the liner 100 has another diameter associated with it, and includes the axial depth or profile height of the second texture 130. The diameter of the third axial section 116 is less than the diameter of the first axial section 112. In one example, the difference in the diameters may be on the order of 3-5 millimeters. Due to the difference in diameters between the first and third axial sections 112, 116, a machined radius may be provided transition regions 136 between the sections to prevent a discrete step causing a possible stress riser in the liner.

In other examples, the outer surface 102 of the liner 100 is selectively and circumferentially machined along an axial length of the liner to a predetermined profile. The predetermined profile may include sections with a constant diameter and texture, such as the first, second, and third texture above, as well as sections with a tapering or gradually changing diameter or texture. For example, the predetermined profile may include transition regions 136 between the first, second and third axial sections 112, 114, 116 where the transition includes an increasing or decreasing diameter taper with a gradually or continually changing specific surface area and diameter of the liner. In one example, the transition region 136 may include a variable and continuously increasing or decreasing amount of projection removal. In other examples, a transition region 136 may be used to blend an axial section with a machined texture with a section with a specific surface area of approximately one.

In various examples, the predetermined profile provides for a specific surface area that varies with axial length of the liner and is without a step change in specific surface area. The predetermined profile therefore also has a diameter that varies along axial length of the liner, and is without a step change in diameter. The predetermined profile may contain cast projections, machined textures with a specific surface area greater than one, and "smooth" machined surfaces. The predetermined profile has an associated thermal conductivity, and by providing a controlled, varying predetermined profile as described, the further improvements in uniformity of the bore wall temperature during engine operation may be realized.

Figure 3A:
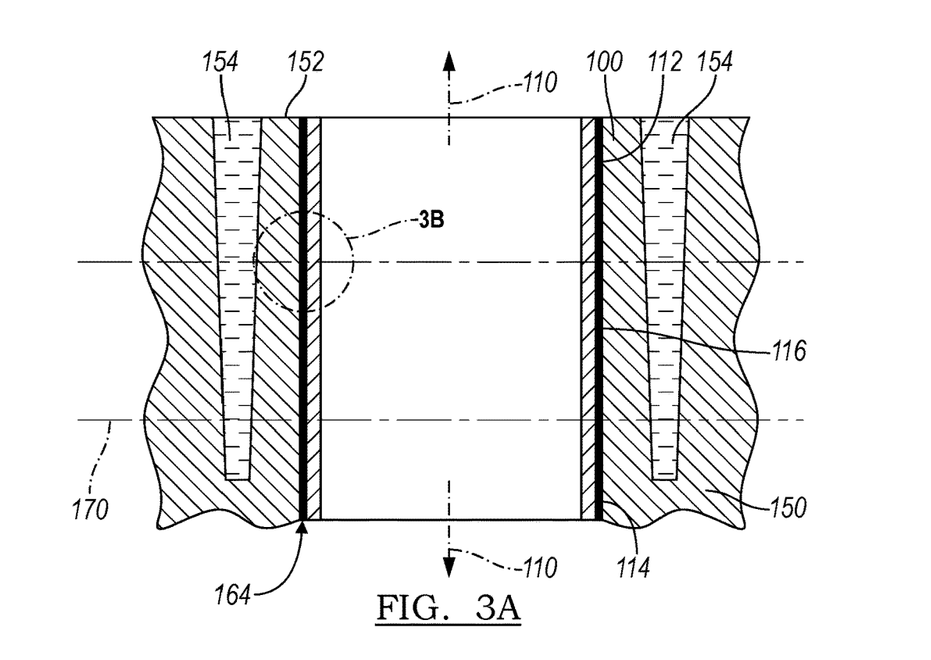
FIGS. 3A and 3B illustrate sectional views of the cylinder block of the engine of FIG. 1.
Figure 3B:
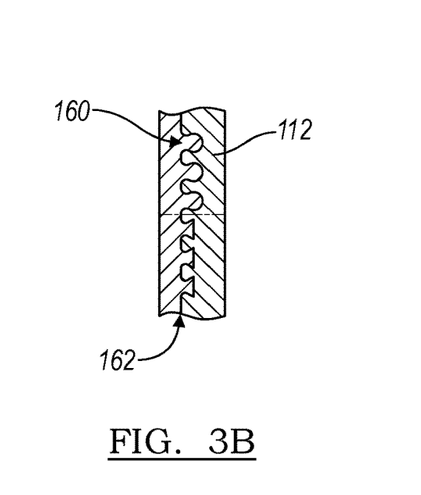

FIGS. 3A-3B illustrate schematic views of the liner 100 of FIG. 2A in an engine block 150. The cylinder block 150 is formed about the cylinder liner 100 with a first end 106 of the liner adjacent to or co-planar with a deck face 152 of the block 150. The block 150 defines a cooling jacket 154 extending circumferentially about at least a portion of the outer surface of the liner 100 and spaced apart therefrom. Cooling jacket 154 may form at least a portion of jacket 84 in fluid system 80. Block 150 material may extend between adjacent liners 100 in an interbore region, and interbore cooling passage may be provided in the interbore region. The liner 100 is shown as having a first circumferential section 112, a second circumferential section 114, a third circumferential section 116, and a fourth circumferential section 190.

The first circumferential section 112 of the outer surface 102 of the liner 100 has the first texture 120 forming a first material interface 160 with the block 150. This first circumferential section 112 is adjacent to the first end 106 of the liner. The block 150 material extends between adjacent first projections 122 or the first texture 120 surfaces to form an interlocking structure therewith and the first interface 160 as shown. The first material interface 160 has a first thermal conductivity thereacross, as determined via experimental temperature measurements and heat transfer experiments.

The third circumferential section 116 of the outer surface 102 of the liner 100 has the second texture 130 or the series of second projections forming a second material interface 162 with the block 150. This circumferential section 116 is spaced apart from the first end 106 of the liner 100 and may be directly adjacent to or adjoin the first section 112. The first circumferential section 112 is therefore positioned between the first end 106 and the third circumferential section 116. The block 150 material extends between adjacent second projections 132 to form an interlocking structure therewith and the third material interface 162 as shown. The third material interface 162 has a third thermal conductivity thereacross, as determined via experimental temperature measurements and heat transfer experiments. The third thermal conductivity is less than the first thermal conductivity.

If the second texture is formed by machining away or removing only a portion of the first texture, the density of the series of first projections 120 is equal to a density of the series of second projections 130, and an axial length of each of the first projections 122 is greater than an axial length of each of the second projections 132. Alternatively, the first texture 120 may be completely removed in the third circumferential section 116 and a new texture 130 or pattern may be provided in section 116. Section 116 therefore results in a smaller outer diameter of the liner compared to an outer diameter of the liner in section 112.

The third circumferential section 116 is positioned on the liner 100 such that it overlaps a piston ring height at bottom dead center as shown by broken line 170. The upper and lower edge of the third circumferential section 116 may be changed depending on the block 150 configuration, the thermal management requirements, and other considerations, such as the cylinder number or position in the block 150.

In some examples, the third circumferential section 116 may be spaced apart from the second end 108 of the liner 100 as shown such that there is a second circumferential section 114 of the outer surface 102 of the liner 100. The second section 114 may have the same texture as the first section 112, or another texture. In the example shown, the second circumferential section 114 has another series of first projections 120 forming a second material interface 164 with the block 150. In other examples, the third circumferential section 116 may extend to the second end 108 of the liner 100, such that there is no second section 114.

The second material interface 164 may have the first thermal conductivity thereacross, if the textures are the same, e.g. the projections 122 are the same as those in the first section 112, and as determined via experimental temperature measurements and heat transfer experiments. The second circumferential section 114 is directly adjacent to or adjoining the second end 108. The series of first projections in the first and second sections 112, 114 each have a common first projection 122 shape and size, thereby providing having a common projection profile and a common density of projections between the first and second sections 112, 114.

The textures 120, 130 or first and second projections 122, 132 on the outer surface 102 of the liner 100 interface with the block 150 material increase the adhesion of the liner 100 within the surrounding block 150 material by providing for improved bond strength with the surrounding block material, especially when the liner 100 and block 150 are formed from different materials with different thermal expansions with engine operation. The longer first projections 122 in the first and second sections 112, 114 additionally provide an increased shear strength at an upper and lower region of the liner 100 to anchor the liner in the block. The textures 120, 130 have surfaces that extend transversely to the liner outer surface, or have a transverse component thereto, to align with axial loading of the liner. The textures 120, 130 may additionally undercut or negative pitch surfaces to align with radial loading of the liner.

The axial lengths, or lengths along axis 110, of each of the first, second, and third sections 112, 114, 116 are sized and positioned to control the bore wall temperature of the cylinder and liner 100 in the block 150 during engine 20 operation. The higher thermal conductivity in the first circumferential section 112 provides for increased heat transfer adjacent to the hot, upper region of the cylinder 22. The reduced thermal conductivity in the third circumferential section 116 provides less heat transfer from the cylinder and liner 100 in this region, and allows the bore wall temperature to be warmer here than it would if the first projections 122 and associated first thermal conductivity extended the length of the liner 100.

Figure 4:
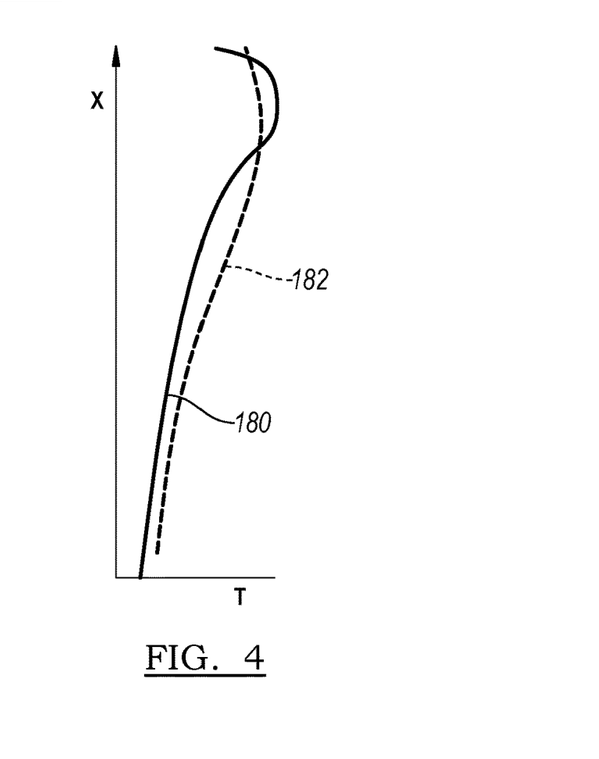
FIG. 4 illustrates an axial temperature profile for the block of FIG. 3A compared to a conventional liner in an engine block.

FIG. 4 illustrates a temperature plot illustrating bore wall temperature for a conventional cylinder liner at line 180 compared to a cylinder liner 100 as shown in FIG. 3A during engine operation at liner 182. As can be seen from the Figure, the disclosed cylinder 100 liner of FIG. 3A operates with a more uniform bore wall temperature than the conventional cylinder liner and a warmer bore wall temperature in an intermediate axial region of the liner 100. Various advantages are associated with a more uniform bore wall temperature which provides reduced bore distortion and maintains a more cylindrical shape of the liner 100 along the length of the liner. For example, reduced bore distortion may result in reduced piston ring friction and wear, reduced blow-by of combustion gases, reduced engine oil or lubricant consumption, lower engine noise, and increased engine efficiency and improved fuel economy.

Figure 5:
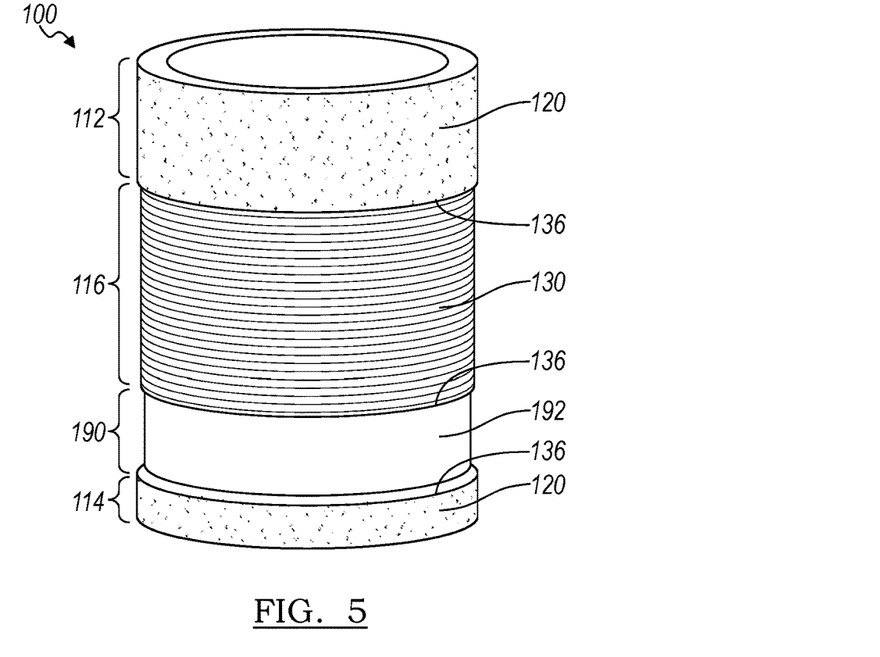
FIG. 5 illustrates a perspective view of another cylinder liner for use with the engine of FIG. 1.

FIG. 5 illustrates a variation of the liner 100 shown in FIG. 3A. In addition to the first, second, and third axial sections or circumferential sections 112, 114, 116 as described above with respect to FIGS. 3A and 4, the liner has a fourth circumferential section 190 or axial section.

The fourth section 190 has a third texture 192. The third texture 192 may be provided by a machined pattern or texture such as transverse ribs or threads, a smooth machined surface, or a series of third projections that cover the outer surface in this section. The third texture 192 or third projections are formed from the same base material as the liner 100. In one example, the third projections are formed by a reduced profile thickness portion of the first texture, and have the same feature density as the first projections 122, or the same number of projections per unit projected area. The third projections or third texture 192 has a profile height or axial length that is less than the profile height of the first projections 122 and of the second projections 132. In another example, the third texture 192 is machined from the liner material underneath the first texture 120. In either case, the third texture 192 or series of third projections has a lower specific surface area than the first texture 120 and a lower specific surface are than the second texture 130. The fourth axial section 190 also has a smaller outer diameter for the liner than the first and third axial sections 112, 116.

The fourth section 190 forms a fourth material interface with the surrounding block 150 material.

The fourth circumferential section 190 of the outer surface 102 of the liner 100 has the third texture 192 forming a fourth material interface with the block. This fourth circumferential section 190 may be positioned between and adjoining the first and third sections 112, 116 or between and adjoining the second and third sections 114, 116. The fourth material interface has a third thermal conductivity thereacross, as determined via experimental temperature measurements and heat transfer experiments. The third thermal conductivity is less than the first thermal conductivity and is less than the second thermal conductivity.

Figure 6:
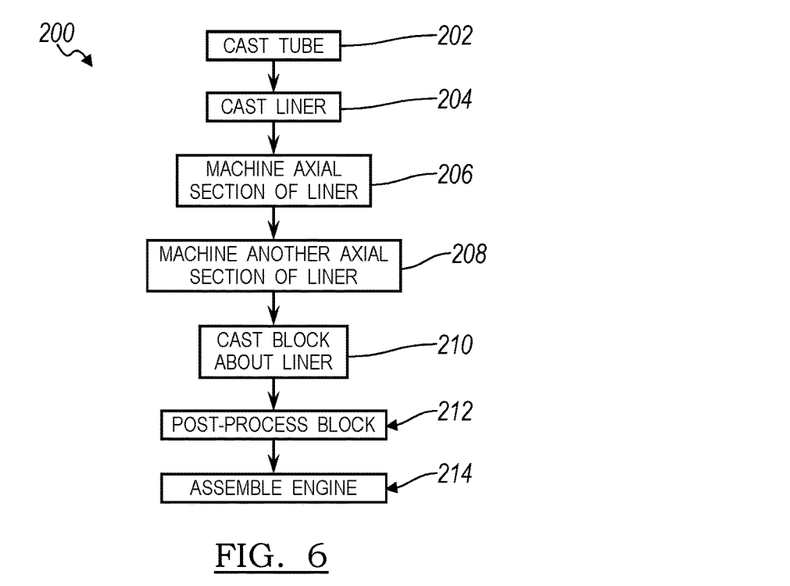
FIG. 6 illustrates a flow chart for a method of forming the engine of FIG. 1 according to an embodiment.

FIG. 6 illustrates a flow chart for a method 200 of forming an engine and of forming a liner for use in an engine, such as the liner 32 in engine 20 of FIG. 1, or liner 100 in block 150 in FIG. 2 or 5 above. The method may include greater or fewer steps than shown, the steps may be rearranged in another order, and various steps may be performed serially or simultaneously according to various examples of the disclosure.

At step 202, a tube is cast, and may be formed from iron or another ferrous alloy, steel, or the like. The tube is cast with an external surface and an internal surface, with each of the external and internal surfaces shaped to be round cylindrical, and arranged concentric with one another. The external surface of the tube is cast with a first texture 120, e.g. a plurality of first projections, extending circumferentially about the external surface and between opposite ends of the tube. The tube may be cast using a centrifugal casting technique or another casting process such that the first texture 120 or first plurality of projections are formed as a part of the casting process and are integrally formed with the liner at the time of casting. The tube is formed with an axial length that corresponds to a number of liners, such that a liner 100 is formed by a portion or section of the tube.

At step 204 the tube is transversely machined or otherwise cut into two or more liners 100. The internal surface of the tube therefore corresponds with and provides an inner surface 104 of the liner. Likewise, the external surface of the tube corresponds with and provides the outer surface 102 of the liner.

The liner 100 is therefore provided with an outer surface 102 with the first texture 120 provided thereon. The first texture 120 is provided on the entire outer surface 102, or is provided to extend circumferentially about the liner 100 from a first end 106 to a second end 108 of the liner. The first texture 120 has a first specific surface area. For a first texture with a series of first projections 122, the projections 122 are cast to be generally uniform in size and shape, e.g. dimensionally within a ten percent range.

At step 206, a section 116 or band of the outer surface 102 of the liner 100 is machined or otherwise processed to provide a second texture 130 or a series of second projections. In one example, the liner 100 may be machined using a shallow through-cut machine lathe process. The section 116 or band of the outer surface 102 extends circumferentially about the outer surface 102 and along an axial section of the liner 100 that is less than an axial length of the liner 100.

During the machining process, the band 116 of the second texture 130 is machined by removing an outer portion of the first texture 120 in this region of the liner, or by removing an outer portion of the series of first projections in the section of the liner such that a portion of the first texture 120 remains to provide the second texture 130. In an alternative example, the first texture 120 is removed during the machining process, and a second texture 130 is formed from the liner material beneath the first texture 120. The second texture 130 may be machined with a transition region or radius of curvature between the first and second textures 120, 130 as described above, or the liner 100 may be machined such that the outer surface has a predetermined profile. The second texture 130 has a lower specific surface area than the first texture 120. A radius of the liner 100 at the second texture 130 may also be less than a radius of the liner at the first texture 120, on the order of millimeters.

The band 116 of the second texture 130 may be machined to be spaced apart from the first end 106 of the liner, such that the liner 100 has a first texture 120 on an outer surface 102 between the first end 106 and the band 116 of the second texture.

The band 116 of the second texture 130 may also be machined to be spaced apart from the second end 108 of the liner, such that the liner 100 has a first texture 120 on an outer surface 102 between the second end 108 and the band 116 of the second texture. In other examples, the band 116 of the second texture may be machined to be directly adjacent to the second end 108 such that it extends thereto.

At step 208, another section 190 or band of the outer surface 102 of the liner 100 may be machined or otherwise processed to provide a third texture 192. The another section or band 190 of the outer surface extends circumferentially about the outer surface 102 and along another axial section of the liner 100 that is less than an axial length of the liner.

During the machining process, the band 190 of the third texture 192 is provided by removing an outer portion of the first texture 120 in this region of the liner, or by removing an outer portion of a sub-section of the second texture 130, or an outer portion of the liner underneath the first texture 120. The third texture 192 has a different specific surface area than the second texture 130. A radius or outer diameter of the liner 100 at the third texture 192 may also be less than a radius or outer diameter of the liner at the second texture 130. In an alternative example, the third and fourth sections 116, 190 may be machined to a common diameter, e.g. with a smooth surface, and then the fourth section 190 further machined to provide a texture thereon such as a series of ribs, such that the fourth section 190 has a higher specific surface area than the third section 116.

The section 116 with the second texture 130 may be positioned between the first end 106 and the fourth section 190 with the third texture. The fourth section 190 with the third texture is therefore positioned between the second end 108 and the section 116 with the second texture. In one example, the section 116 with the second texture and the another section 190 with the third texture are directly adjacent to one another. The another section 190 with the third texture may be spaced apart from the second end 108 such that the liner 100 has a first texture 120 on an outer surface 102 between the second end 108 and the band 190 of the third texture.

In further steps, additional bands of further textures, e.g. a fourth texture, etc. may be machined on the outer surface 102 of the liner 100. In other examples, the outer surface may be machined to have various textures with transition regions including tapers or blended regions, such that a predetermined profile is provided with varying diameters and surface areas to provide a smoothly varying thermal conductivity along an axial length of the liner 100.

At step 210, the liners 100 are positioned within a tool, and the engine block 150 is cast about the liners. The liner 100 is positioned within the tool, and various dies, slides or other components of the tool are moved to close the tool in preparation for a casting process. The dies and slides have cylinder block forming surfaces. The liners 100 are therefore used in an insert casting process to form the block 150. In one example, the tool is provided as a tool for a high pressure die casting process of metal, such as aluminum or an aluminum alloy.

After the tool is closed with the liner 100 positioned and constrained in the tool, material is injected or otherwise provided to the tool to generally form the engine block 150. In one example, the material is a metal such as aluminum, an aluminum alloy, or another metal that is injected into the tool as a molten metal in a high pressure die casting process. In a high pressure die casting process, the molten metal may be injected into the tool at a pressure of at least 20,000 pounds per square inch (psi). The molten metal may be injected at a pressure greater than or less than 20,000 psi, for example, in the range of 15,000-30,000 psi, and may be based on the metal or metal alloy in use, the shape of the mold cavity, and other considerations.

During the block casting step 210, molten metal flows around and into contact with the outer surface 102 of the liner 100 and into the textures, e.g. between adjacent projections, threads, and the like. The molten metal cools and forms a casting skin such that the block 150 forms a first material interface 160 with the first texture 120 of the outer surface of the liner, a second material interface 162 with the second texture 130, etc. The first material interface 160 has a higher thermal conductivity than the second material interface 162. A combination of the specific surface area of the respective texture, the fluid dynamics, solidification, and contraction of the alloy surrounding the texture during casting, and the thickness of the liner in the associated region may affect the thermal conductivity. The second material interface has a higher thermal conductivity than a third material interface with the third texture.

In a further example, the outer surface 102 of the liner 100 may be coated prior to being positioned in the tool to reduce oxidation. The liner 100 may have an outer surface 102 that is acid dipped, for example in fluoritic acid, and then rinsed to reduce oxidation and possible porosity issues in adjacent cast block material in a finished block 150 and improve contact between the liner 100 and the cast block 150 at the material interfaces. Alternatively, an inner surface 104 and/or outer surface 102 of the liner may be spray coated, for example, using a plasma spray coating, thermal spray coating, or another process.

The different textured regions on the outer surface 102 of the liner 100 have different specific surface areas and provide different material interfaces with the surrounding cast engine block 150. These different material interfaces provide different thermal conductivities and different heat transfer rates along the length of the liner to maintain a more uniform bore wall temperature during engine operation.

In another variation, the band 116 of the second texture 130 may be machined, for example, at different distances from the first end 106 about the circumference of the outer surface 102 such that the upper edge and/or lower edge of the band 116 is a varying distance from the first end 106 of the liner 100 about a circumference of the liner. The varying shape and positioning of the first and second textures 120, 130 may correspond to different locations of the liner 100 in a finished block, for example to provide further thermal control and management via different thermal conductivities along different axial regions of an outer surface for a liner, e.g. an interbore location, etc.

In a further variation, different liners 100 may be machined to have different respective sizes of bands of textures, e.g. such that the second texture band 116 of one liner is farther from the first end 106 and/or a different axial length than another liner. The different liners may be used at different cylinder locations in an engine block, for example, to provide further thermal control and management via different thermal conductivities for liners 100 that are used as end cylinders or middle cylinders in an engine.

At step 212, the block 150 is removed from the tool, and undergoes various finishing steps. The process in step 210 may be a near net shape casting or molding process such that little post-processing work needs to be conducted. A surface of the block 150 may be machined to form the deck face 152 of the block adjacent to the first end 106 of the liner 100, for example, by milling. The unfinished block may also be cubed or otherwise machined to provide the final block for use in engine assembly. The inner surface of the liner 100 may be bored or otherwise finished.

At step 214, the finished block 150 may be assembled with a corresponding head, piston, crankshaft, etc. to form an engine such as engine 20.

Various examples of the present disclosure have associated non-limiting advantages. For example, during the operation of an internal combustion engine having a reciprocating piston design, combustion takes place in the combustion chamber. This combustion chamber may be located in a region where the head that is assembled to the block. The block defines cylinders that the pistons reciprocate within, and one end of each cylinder is associated with the combustion chamber. The combustion events within the chamber increase the temperature of the block surrounding the cylinders. Block heating may be greatest near the heat generating combustion event and lowest on the opposite end of the cylinder thus creating a temperature gradient along the axis of the cylinder. As a result of the increased temperature, the cylinder liner expands, and due to the temperature gradient, this expansion may be non-uniform along an axial length of the block. The cylinder liner and block according to the present disclosure provide a more uniform bore wall temperature that acts to maintain parallelism of the bore walls along the axial length of the cylinder and thereby reduce friction between the reciprocating piston and the cylinder wall.

An engine and cylinder block incorporates a cooling jacket surrounding or partially surrounding the cylinder bores. The cooling jacket(s) contain a liquid fluid that is circulated around the cylinders to control the operating temperature of the engine by removing excess heat generated from the combustion events and transferring it to the atmosphere via a radiator or other heat exchanger. A difference in temperature between the cylinder wall or liner wall and a cooling jacket wall facing the cylinder drives the thermal flux, or movement of thermal energy, from the cylinder to the coolant in the jacket.

Conventional engine blocks may use a diverter or spacer in the cooling jacket, or a complex shape for the cooling jacket to try to thermally control and manage the cylinder wall temperature profile. Challenges exist for these techniques both in complexity of manufacturing, costs, and other tooling and assembly considerations.

The block according to the present disclosure provides for a cylinder wall with improved uniformity of the bore wall temperature. An intermediate region of the cylinder wall is at a higher temperature during engine operation than it normally would be for a conventional engine in that region, which reduces the temperature gradient along the axis of the cylinder providing a more uniform temperature, reduced distortion, and a more parallel bore for the reciprocating piston.

In the present disclosure, the liners are cast into the block, with the liners being formed from an iron or other ferrous material, while the block is cast from aluminum or an aluminum alloy. This results in the reduced weight and other advantages of an aluminum block combined with the wear properties of an iron cylinder. The liner is provided with multiple outside diameter cylinder textures or conditions such that the interface of higher conductivity is nearest the combustion event and that of a lower conductivity is at the intermediate region or opposing end, such that the cylinder bore wall temperature may be controlled as described.

Additionally, the liner may operate with a higher liner temperature overall, e.g. by increasing the temperature in the intermediate or mid-stroke region. This higher liner temperature, especially in the mid-stroke region overlapping with the second texture, may provide for an increased temperature of lubricating fluids, e.g. engine oil, in this region and improved (reduced) viscosity where the piston is moving the fastest and the piston-to-bore wall interaction is the most dynamic. Additionally, a low piston speed, e.g. at the bottom of the bore, allows for more thermal loading at that location than an intermediate region above. In one example, the first texture is provided at an upper section of the liner, and a second machined textures is provided at a lower section of the liner, while the intermediate section of the liner has the third texture or a smooth surface. In this case, the second texture provides an interlocking feature at the bottom of the liner and slightly increased thermal conductivity near BDC where the piston is slow and has more time to release heat to the surrounding block. The third texture in an intermediate or central region provides a reduced diameter, thinner liner in this section to regionally raise the liner temperature for reduced bore distortion and reduced lubricant viscosity While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. An engine cylinder liner comprising:
a tubular member having first and second ends with an outer surface extending therebetween, a specific surface area and a diameter of the outer surface varying with an axial position on the liner to provide a thermal conductivity that varies with the axial position and is complementary to engine operating conditions, wherein the specific surface area varies with a corresponding change in diameter, wherein the outer surface of the liner defines a first axial section with a first texture and a second axial section with a second texture, a specific surface area of the first texture being greater than a specific surface area of the second texture, an outer diameter of the liner at the first texture being greater than an outer diameter of the section of the liner with the second texture.

2. The engine cylinder liner of claim 1 wherein the outer surface of the liner defines a transition region positioned between the first and second axial sections, the first axial section adjoining the first end.

3. The engine cylinder liner of claim 1 wherein specific surface area of the outer surface varies continuously with the axial position of the liner along at least an axial section of the liner such that the associated thermal conductivity varies continuously.

4. The engine cylinder liner of claim 1 wherein the second axial section of the outer surface of the liner with the second texture is spaced apart from the first and second ends.

5. The engine cylinder liner of claim 1 wherein the second axial section of the outer surface with the second texture is spaced apart from the first end and extends to the second end.

6. The engine cylinder liner of claim 1 wherein the outer surface of the liner defines a third axial section with a third texture extending circumferentially about the liner and spaced apart from the first end, wherein the third texture has a lower specific surface area than the second texture.

7. The engine cylinder liner of claim 6 wherein the third section is positioned between the first section and the second section.

8. The engine cylinder liner of claim 6 wherein the third section is positioned between the second section and the second end.

9. The engine cylinder liner of claim 4 wherein the first texture comprises a series of first projections, and wherein the second texture comprises a series of second projections.

10. The engine cylinder liner of claim 4 wherein the second texture comprises at least one rib extending circumferentially on the liner.

11. The engine cylinder liner of claim 1 wherein the first end of the liner is a deck-face end of the liner, and wherein the first axial section is positioned between the first end and the second axial section.

* * * * *